United States Patent [19]

Nakanishi

[11] Patent Number: 4,825,983

[45] Date of Patent: May 2, 1989

[54] INERTIA DAMPER

[76] Inventor: Motoyasu Nakanishi, 1461-47 Tenma, Fujishi Shizuokaken, Japan, 419-02

[21] Appl. No.: 163,109

[22] Filed: Mar. 2, 1988

[30] Foreign Application Priority Data

| Mar. 14, 1987 | [JP] | Japan | 62-59857 |
| Sep. 26, 1987 | [JP] | Japan | 62-241775 |
| Sep. 30, 1987 | [JP] | Japan | 62-246855 |
| Sep. 30, 1987 | [JP] | Japan | 62-246856 |
| Oct. 2, 1987 | [JP] | Japan | 62-249281 |

[51] Int. Cl.$^4$ ............................................. F16F 7/10
[52] U.S. Cl. ............................... 188/378; 74/574; 310/49 R; 310/74; 188/322.5; 188/218 A; 267/136
[58] Field of Search .................... 188/378–380, 188/322.5, 268, 267, 218 A, 18, 218 R, 218 XL; 310/49 R, 51, 74, 103; 464/180, 181; 74/574; 416/500, 190; 267/136

[56] References Cited

U.S. PATENT DOCUMENTS

| 1,855,570 | 4/1932 | Edison | 188/378 X |
| 2,137,591 | 11/1938 | Sarazin | 188/378 |
| 3,020,980 | 2/1962 | Baker et al. | 188/378 |
| 3,091,307 | 5/1963 | Tiedemann et al. | 188/378 |
| 3,790,831 | 2/1974 | Morreale | 310/49 X |
| 3,901,101 | 8/1975 | McGavern | 74/574 |
| 4,049,985 | 9/1977 | Sudler | 188/378 X |
| 4,123,675 | 10/1978 | Moskowitz et al. | 310/49 R |
| 4,200,003 | 4/1980 | Miller | 74/574 |
| 4,236,426 | 12/1980 | Meinke et al. | 74/574 |
| 4,271,935 | 6/1981 | Pelat et al. | 188/380 X |
| 4,361,213 | 11/1982 | Landis Jr. et al. | 188/378 |
| 4,368,807 | 1/1983 | McLean et al. | 188/322.5 X |
| 4,392,681 | 7/1983 | Raquet | 464/180 X |
| 4,471,538 | 9/1984 | Pomeranz et al. | 188/322.5 X |
| 4,527,675 | 7/1985 | Omata et al. | 188/322.5 X |
| 4,565,266 | 1/1986 | Omata | 188/322.5 |
| 4,653,616 | 3/1987 | Mizusawa | 188/322.5 X |
| 4,669,327 | 6/1987 | Aratsu | 464/180 X |
| 4,707,751 | 11/1987 | Ozaki et al. | 464/180 X |
| 4,733,758 | 3/1988 | Duclos et al. | 188/322.5 X |
| 4,734,079 | 3/1988 | Viets | 464/180 X |

FOREIGN PATENT DOCUMENTS

| 58-123362 | 7/1983 | Japan . |
| 61-9156 | 1/1986 | Japan . |
| 61-51035 | 3/1986 | Japan . |
| 62-13839 | 1/1987 | Japan . |

OTHER PUBLICATIONS

Japenese Publication entitled "Testing Method for Penetration of Petroleum Asphalt", with English translation, 1976.

Primary Examiner—Douglas C. Butler
Attorney, Agent, or Firm—Wenderoth, Lind & Ponack

[57] ABSTRACT

An inertia damper having a mounting base to be mounted on a rotary shaft and an inertia weight component which is coupled to the mounting base through a vibration absorbing layer, the vibration absorbing layer being made of a gel material with a penetration valve of approximately 50 to 200. The inertia weight component is adhered to one surface of the vibration absorbing layer and the other surface of the vibration absorbing layer is adhered to the mounting base of the rotary shaft. A vibration wave generated at the rotary shaft side is dispersedly absorbed by deformation of gel material which forms the vibration absorbing layer and a vibratory component can be removed from a braking motion.

20 Claims, 13 Drawing Sheets

FIG. 11
FIG. 12
FIG. 13
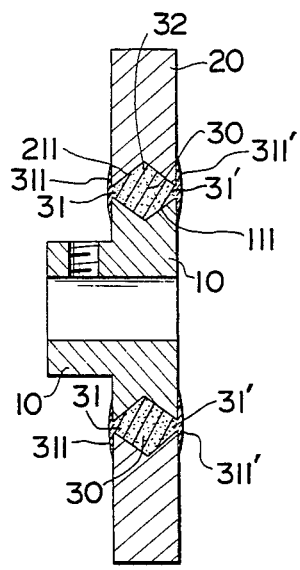
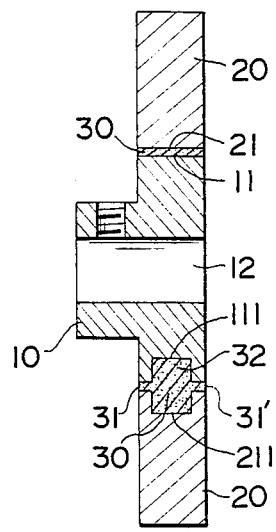
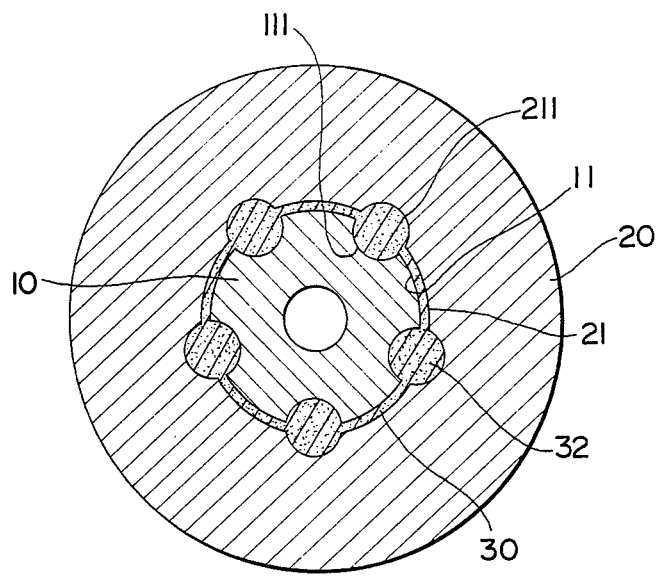

FIG. 29
FIG. 30
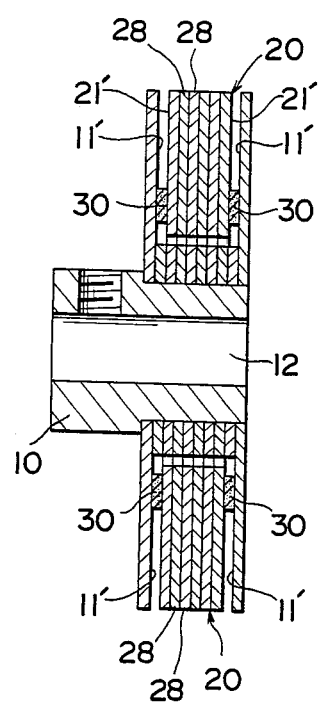
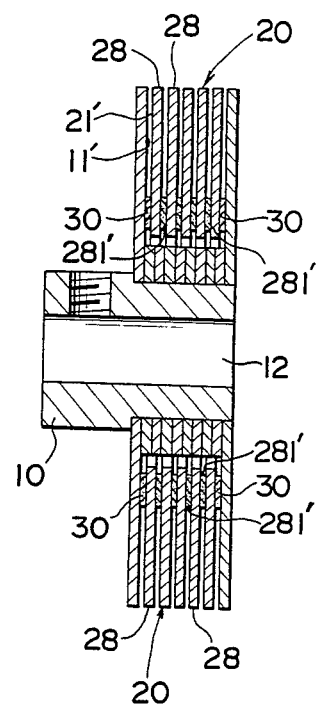

INERTIA DAMPER

BACKGROUND OF THE INVENTION

The present invention relates to an inertia damper for preventing vibration of a rotary shaft of an apparatus such as, for example, a stepping motor or the like which frequently repeats start and stop motions.

In the stepping motor, the rotation should accurately follow the input pulse and it is necessary to eliminate resonance and an unstable phenomenon which may be caused during operation.

Therefore, it is necessary to reduce the braking time which is the transient response characteristic of the stepping motor and such reduction can be achieved by quickly controlling the vibration of the transient response characteristic. For this reason, the conventional stepping motor is provided with an inertia damper at its rotary shaft to control an inertia moment which acts on the rotary shaft.

Such an inertia damper is available as an electrical type and a mechanical type, and the electrical type inertia damper is based on a capacitor damping system or a magnetic mounting system and the mechanical inertia damper uses an elastic member or a viscous fluid.

The mechanical inertia damper using an elastic member is disclosed in Japanese Patent Gazette for Laid Open No. SHO 61-9156 and the damper using viscous fluid is disclosed in Japanese Patent Gazette for Laid Open No. SHO 58-123362.

Of the above mechanical inertia dampers, however, the inertia damper using the elastic member is provided with an elastic member made of an elastic material such as, for example, rubber as a fitting means between the mounting base fixed on the rotary shaft and the inertia weight component and therefore accompanies a problem that a repulsive elasticity is produced in an elastic member when the inertia moment is absorbed and a new vibration may be produced by this repulsive elasticity and the damper is inferior in absorptivity of inertia moment. The inertia damper using a viscous fluid also accompanies a problem that an oil seal for sealing the fluid is required and production costs are high due to strict machining accuracy.

SUMMARY OF THE INVENTION

An object of the present invention is to provide an inertia damper which can be easily sealed between the mounting base and the inertia weight component and uses a vibration absorbing layer with an extremely small repulsive elasticity.

For this purpose, in the present invention, the vibration absorbing layer which couples the mounting base and the inertia weight component is made of a gel material with a penetration value of approximately 50 to 200 as measured by JIS (Japan Industrial Standard) K 2530-1976-(50 g load).

Since this kind of gel material has a characteristic which absorbs an external energy by non-elastic deformation and a vibration propagating characteristic similar to a liquid, the vibration wave applied to the vibration absorbing layer is dispersedly propagated to the whole vibration absorbing layer and fractionized and absorbed by non-elastic deformation of the vibration absorbing layer as a whole.

Since such gel material is not a liquid, it can be inserted between the inertia weight component and the mounting base fixed on the rotary shaft without using a strict sealing means such as, for example, oil seal and therefore the disadvantages regarding the seal of the conventional inertia damper using viscous fluid can be eliminated.

Another object of the present invention is to provide the inertia damper capable of firmly maintaining the vibration absorbing layer made of gel material between the mounting base and the inertia weight component.

The vibration absorbing layer made of gel material adheres to the fitting surface of the mounting base and the fitting surface of the inertia weight component with its own adhesiveness and has a characteristic that it does not excel in the self profile maintainability and therefore, when the vibration absorbing layer receives a shock in a direction parallel to the fitting surface where a frictional contact takes place, the vibration absorbing layer may come off the fitting surface.

In the case of the present invention, a recessed portion is formed at each of opposing central parts of the fitting surface of the mounting base and the fitting surface of the inertia weight component which is opposed to said fitting surface of the mounting base and the inertia damper is adapted so that a part of all of each fitting surface of the vibration absorbing layer is pushed into each recessed portion.

In such construction, at least a part of the fitting surface of the vibration absorbing layer engages as a wedge with the fitting surface of the inertia weight component side and the fitting surface of the mounting base side and therefore the vibration absorbing layer can be prevented from being separated or coming off from the inertia weight component and the mounting base and the vibration absorbing surface of the vibration absorbing layer can be enlarged.

Another further object of the present invention is to provide the inertia damper in which the vibration absorbing layer can be easily inserted between the inertia weight component and the mounting base.

In general, to form the vibration absorbing layer between the inertia weight component and the mounting base, the mounting base to be mounted on the rotary shaft is loosely fitted into the center hole provided in advance at the inertia weight component and silicone gel original fluid is poured between the inertia weight component and the mounting base, then silicone gel original fluid is heated to be gelled.

However, the method is not suitable to volume production since the inertia weight component and the mounting base are heat-treated as assembled.

In the present invention, a separate component of the vibration absorbing layer is made by gelling in advance silicone gel original fluid in the shape of an O-ring and this vibration absorbing layer is disposed between the inertia weight component and the mounting base.

After the O-ring type vibration absorbing layer has been made as a separate component, a non-tacking skin layer is formed on its surface and adhered with an adhesive agent to the fitting surface of the inertia weight component and that of the mounting base.

Another further object of the present invention is to provide the inertia damper for which the mounting base and the inertia weight component which are concentrically mounted on the rotary shaft are combined so that the inertia weight component does not come off the mounting base.

Therefore, in the present invention, the central part of one fitting surface of either of the mounting base and the inertia weight component is formed with a protruded part and the other fitting surface is provided with a recessed portion which meshes with the protruded part of the opposing fitting surface and said inertia weight component is prevented from comming off in the axial direction of the rotary shaft at least at its part and kept engaged with the mounting base through the vibration absorbing layer made of gel material.

Another further object of the present invention is to provide an inertia damper capable of adjusting the weight of the inertia weight component to be adapted to the load torque.

For this purpose, the inertia weight component is made up by stacking a plurality of doughnut-shaped disks so that the weight of the inertia weight component can be varied by increasing or decreasing the number of disks.

This inertia weight component is loosely fitted to the outside of the mounting base and the vibration absorbing layer made of a gel material is formed between the mounting base and the inertia weight component.

BRIEF DESCRIPTION OF THE DRAWINGS

FIG. 13 is a vertical cross-sectional front view of the inertia damper shown in FIG. 12, FIGS. 14 to 17 are, respectively, vertical cross-sectional side views showing another further embodiment of the inertia damper in accordance with the present invention.

DETAILED DESCRIPTION OF PREFERRED EMBODIMENT

Figure 1:
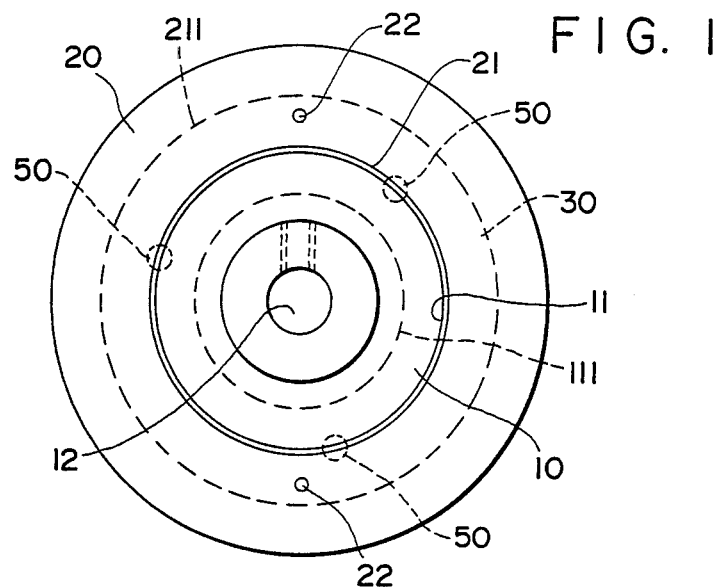
FIG. 1 is a front view of the inertia damper in accordance with the present invention.
Figure 2:
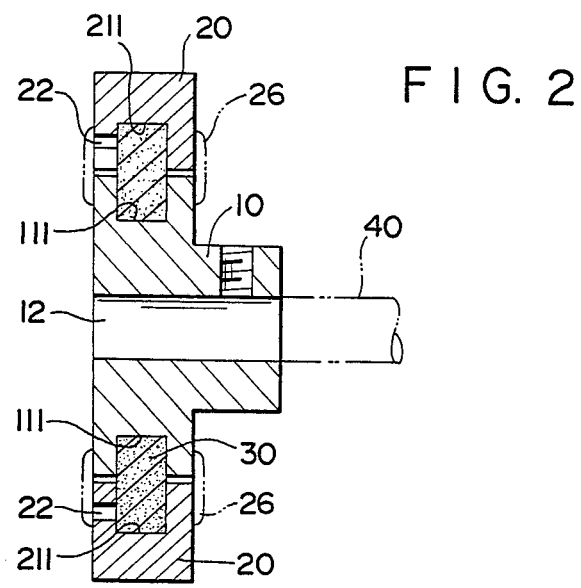
FIG. 2 is a cross-sectional view of the inertia damper shown in FIG. 1, FIGS. 3 to 6 are, respectively, front views showing another embodiment of the inertia damper in accordance with the present invention.

Referring to FIGS. 1 and 2, there is shown an inertia damper comprising a mounting base 10 and an inertia weight component 20 which is coupled to said mounting base 10 with a vibration absorbing layer 30 made of gel material.

Said mounting base 10 is provided with a groove 111 which extends in the circumferential direction at central part of a radially outer peripheral surface comprising fitting surface 11. The mounting base 10 generally has shaft hole 12 into which a rotary shaft 40 is inserted and fixed. Depending on the case, the mounting base 10 can be made to be integral with the rotary shaft.

Said inertia weight component 20 is made as a thick doughnut shaped (annular) disk with a large diameter hole at its center and provided with a groove 211 which extends in the circumferential direction at a central part of a radially inner wall surface of said hole comprising a fitting surface 21.

Said inertia weight component 20 is loosely fitted to the outside of said mounting base 10 and the vibration absorbing layer 30 made of gel material such as, for example, silicone gel material is formed between the inertia weight component 20 and the mounting base 10.

This vibration absorbing layer 30 adheres to said mounting base 10 with its one surface and to the fitting surface 21 of said inertia weight component 20 with its other surface, and accordingly, the inertia weight component 20 is fixed to the mounting base 10 through the vibration absorbing layer 30.

Said vibration absorbing layer 30 is made of gel material with a penetration value of approximately 50 to 200 and silicone gel is suitable as this material.

If the penetration value of gel material is less than 50, the deformation of the vibration absorbing layer 30 is insufficient and, if the penetration value exceeds 200, the fluidity will be high and the deformability of the vibration absorbing layer will be excessive.

In the case where silicone gel is used as the gel material, a method can be adopted wherein the inertia weight component 20 is externally fitted to the mounting base 10 and silicone gel original fluid (which can be gelled by heating) is poured between the inertia weight component 20 and the mounting base 10. For this method, said inertia weight component 20 is provided with a fluid inlet port 22 leading to said groove 211 and silicone gel is supplied to the groove 211 through this fluid inlet port 22 and gelled by heating.

If silicone gel is thus used as the gel material, the vibration absorbing layer 30 can adhere to the fitting surfaces 11 and 21 by means of tackiness of the silicone gel when silicone gel original fluid is gelled.

TORAY SILICONE CF5027 (trademark) made by Toray Silicone Kabushiki Kaisha and KE-1051 (product name) made by Shinetsu Kagaku Kabushiki Kaisha are available as said silicone gel and the compound type silicone gel prepared by mixing fine hollow particles such as, for example, FILLITE (trademark) made by Nippon Fillite Kabushiki Kaisha and EXPANCEL (trademark) made by Nippon Fillite Kabushiki Kaisha can be used. This compound type silicone gel is light and inexpensive and therefore it is advantageous in weight reduction and cost savings of the inertia damper. Particularly, the compound type silicone gel in which said Fillite is mixed has a high heat resistance and is suitable for this inertia damper.

This compound type silicone gel is disclosed in U.S. patent application Ser. No. 87,970 filed on Aug. 17, 1987.

The inertia damper shown in this embodiment can absorb the vibration wave generated from the rotary shaft 40 by non-elastic deformation of the vibration absorbing layer 30 while diffusing the vibration wave in the vibration absorbing layer 30.

In other words, the vibration wave conducted from the rotary shaft 40 is absorbed in the vibration absorbing layer 30 by deformation of said layer while causing a correlative motion between the inertia weight component 20 and the mounting base 10.

In this case, the deformation of the vibration absorbing layer 30 is non-elastic deformation and therefore the vibration wave can be absorbed without causing a repulsive elasticity. Since the gel material has the vibration wave propagating characteristic similar to liquid as described above, the vibration wave is fractionized into the vibration absorbing layer and quickly converted to heat.

In the above description, "non-elastic deformation" means that such remarkable deformation as in rubber or a spring is not provided and the elasticity is not zero in deformation, and the phenomenon that no repulsive elasticity is provided means that the repulsive elasticity is extremely smaller than rubber and a spring and does not mean that the repulsive elasticity is zero.

Figure 8:
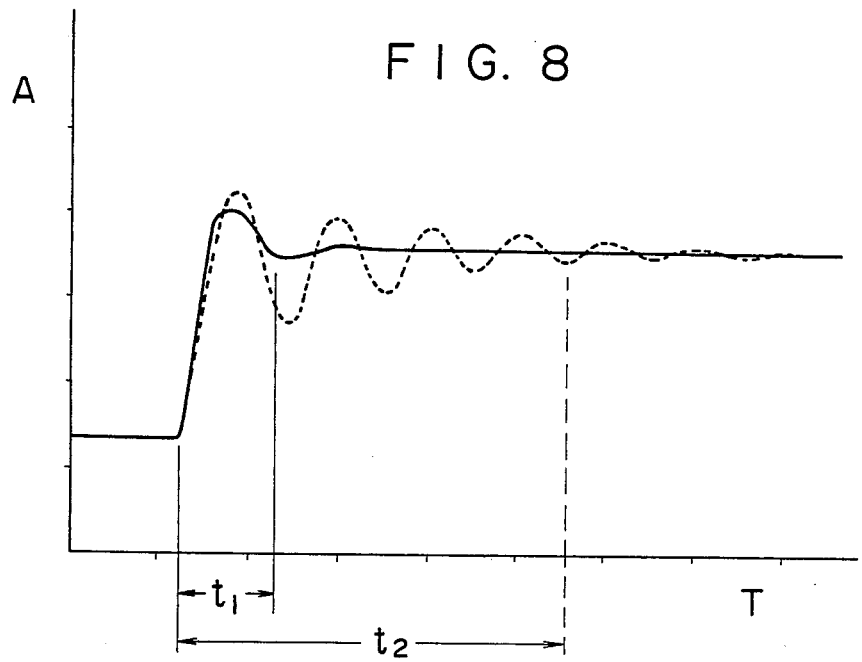
FIG. 8 is a graph showing the braking characteristic of the inertia damper shown in FIG. 1.

In the inertia damper shown in this embodiment, it is clarified that the braking time t1 shown with the solid line in FIG. 8 is extremely smaller than the braking time t2 of the conventional elastic member type inertia damper shown with the broken line. In FIG. 8, T denotes the time and A denotes the angle of rotation.

The inertia damper in accordance with the present invention can be adapted as shown in FIGS. 3 to 7.

Figure 3:
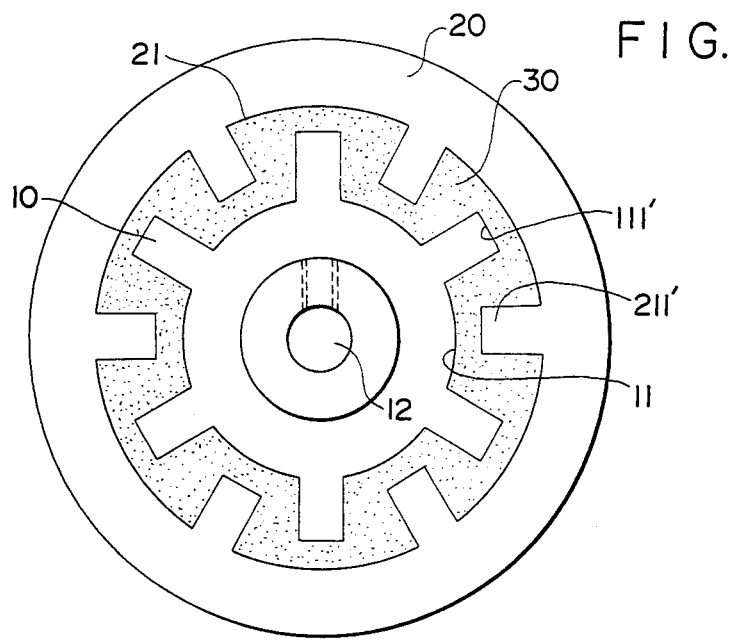

The embodiment shown in FIG. 3 is the inertia damper made up by alternately protruding spaced-apart rectangular protrusions on at least a part of the fitting surface 11 of the mounting base 10 and the fitting surface 21 of the inertia weight component 20 in the radial direction so that these protruded portions 111' and 211' are gear-meshed and providing the vibration absorbing layer 30 between both fitting surfaces 11 and 21.

According to this embodiment, the thickness of the vibration absorbing layer 30 can be increased and the inertia moment applied to the inertia weight component 20 is transmitted from the protruded portion 111' of the fitting surface 11 of the mounting base 10 to the protruded portion 211 of the fitting surface 21 of the inertia weight component 20 through the vibration absorbing layer 30. Accordingly, the vibration absorbing layer 30 is deformed to absorb the vibration wave while being depressed in the circumferential direction.

Figure 4:
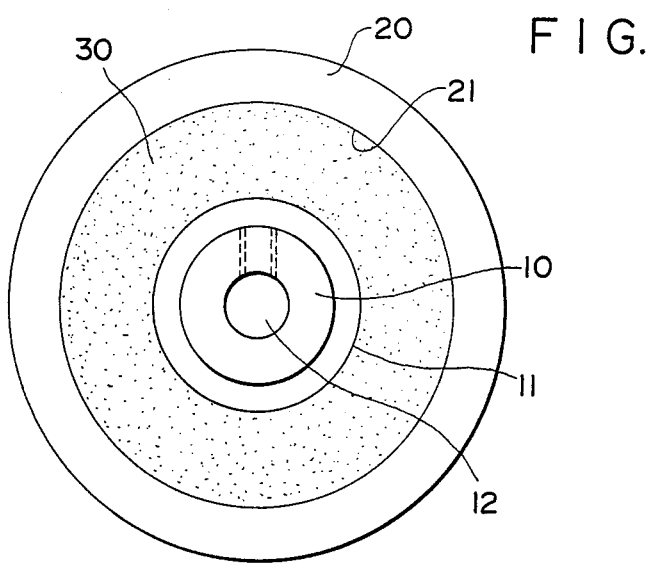

FIG. 4 shows the inertia damper with a widened vibration absorbing layer 30 and, in this embodiment, an improvement of the vibration absorbing effect can be expected in a specific frequency.

Figure 5:
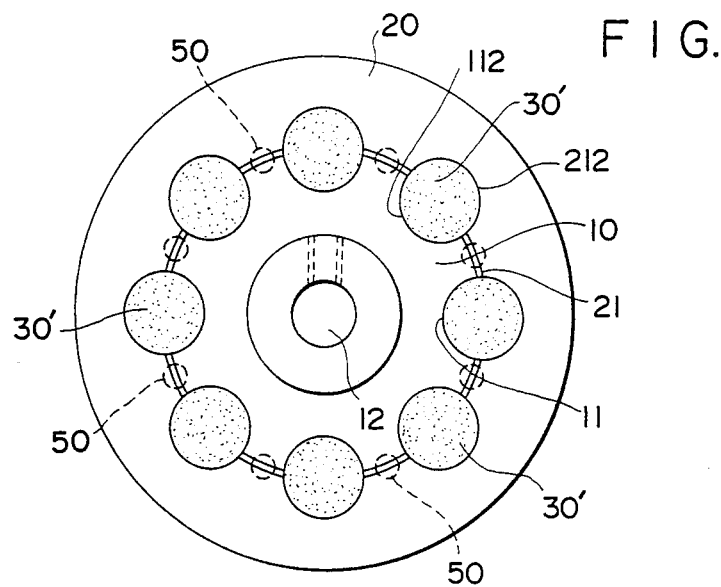

The embodiment shown in FIG. 5 is the inertia damper in which a number of spaced-apart semi-circular recessed portions 112 and 212, which are opposed each other to form, for example, a number of circular spaces at specified distances on the fitting surfaces 11 and 12 of the mounting base 10 and the inertia weight component 20 and the vibration absorbing layer 30' is formed in these circular spaces.

In this embodiment, when the inertia moment in the circumferential direction is applied to the inertia weight component 20, the vibration absorbing layer 30 is depressed in the circumferential direction and deformed to absorb the vibration wave.

Figure 6:
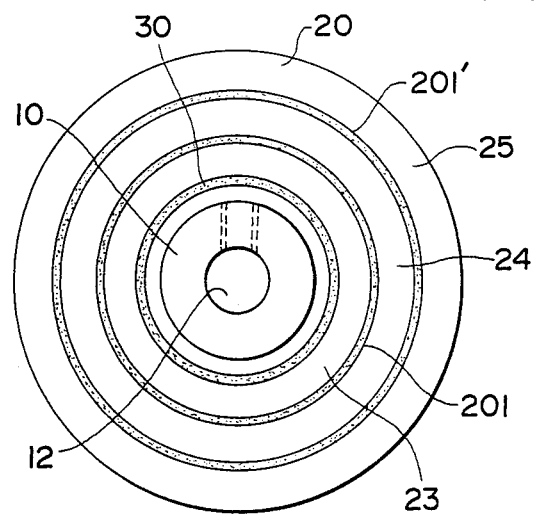

The embodiment shown in FIG. 6 is the inertia damper in which at least one of the vibration absorbing layers 30 is provided in the inertia weight component 20, which is made up by concentrically assembling a plurality of doughnut type annular members 23, 24 and 25 between which the vibration absorbing layers 201 and 201' made of gel material with the penetration value of approximately 50 to 200 such as, for example, silicone gel are inserted.

According to this embodiment, the inertia weight component 20 can internally absorb the vibration wave.

Figure 7:
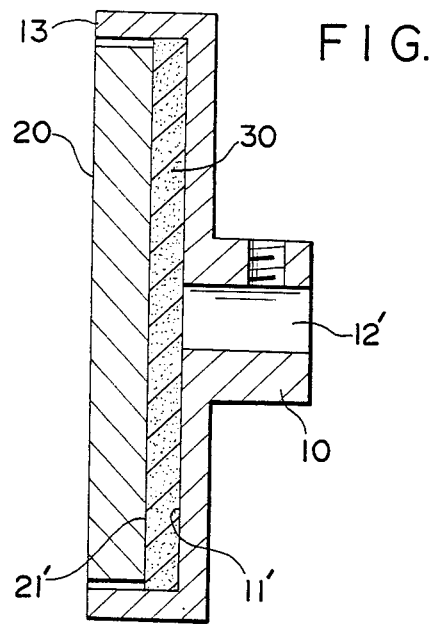
FIG. 7 is a vertical cross-sectional side view showing another embodiment of the inertia damper in accordance with the present invention.

The embodiment shown in FIG. 7 is the inertia damper made up by forming the fitting surface 11' as an axial end surface which is extended like a disk around the shaft hole 12' on the front face of the mounting base 10, providing an axially extending peripheral edge 113 on this fitting surface 11' to accommodate radially inwardly thereof the disk type inertia weight component 20, making the fitting surface 21' axially opposed to the fitting surface 11' of the mounting base 10 and inserting the vibration absorbing layer 30 between both fitting surfaces 11' and 21'.

In this embodiment, the inertia weight component 20 can serve as a cover to prevent adhesion of dust to the vibration absorbing layer 30. In each of the above embodiments, as shown, for example, in FIGS. 1 and 5, the clearance between the inertia weight component 20 and the mounting base 10 can be maintained fixed by providing a ball bearing 50 between the inertia weight component 20 and the mounting base 10, and also a cover 26 for sealing the clearance one edge of which is free between the inertia weight component 20 and the mounting base 10 can be provided on the inertia weight component 20 or the mounting base 10 as shown with the broken line in FIG. 1.

Referring to FIGS. 9 to 13, there is shown another embodiment of the inertia damper in accordance with the present invention.

For convenience of the description, the mounting base 10, inertia weight component 20 and vibration absorbing layer 30 described below are considered similar to those described in the foregoing paragraphs and the detailed description of these components is omitted.

Figure 9:
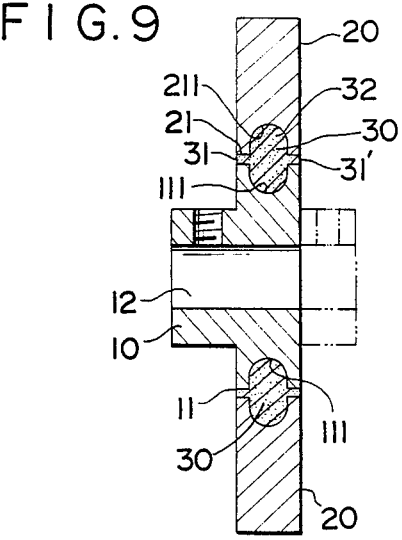
FIG. 9 is a vertical cross-sectional side view showing another further embodiment of the inertia damper in accordance with the present invention.

The embodiment shown in FIG. 9 is the inertia damper in which the vibration absorbing layer 30 formed between the mounting base 10 and the inertia weight component 20 is thin on both axial sides in the circumferential direction and thick at the central portion.

In this embodiment grooves 111 and 211 as shown in FIG. 1 are provided on the fitting surface 21 of the inertia weight component 20 and the fitting surface 11 of the mounting base 10 and filled with the vibration absorbing layer 30.

Figure 10:
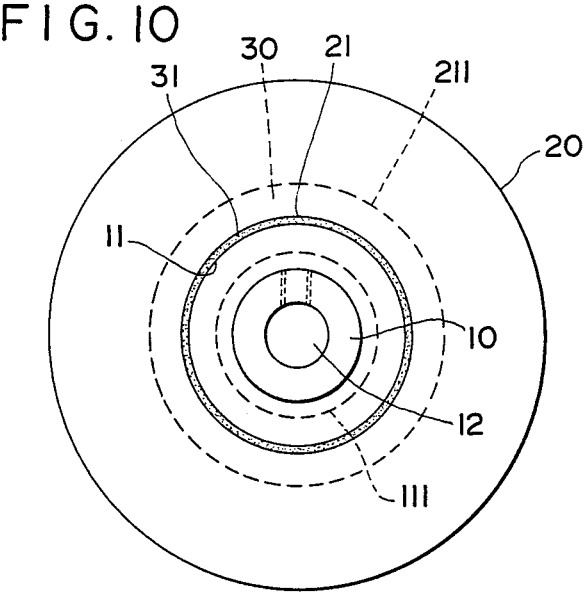
FIG. 10 is a front view of the inertia damper shown in FIG. 9, FIGS. 11 and 12 are, respectively, vertical cross-sectional side views showing another further embodiment of the inertia damper in accordance with the present invention.

The inertia damper of this embodiment, as shown in FIG. 10 is such that the vibration absorbing layer 30 completely separates the fitting surface 21 of the inertia weight component 20 and the fitting surface 11 of the mounting base 10 and therefore the vibration absorbing layer 30 is formed by thin edge portions 31 and 31' at both sides and a thick engaging portion 32 at the center.

In this embodiment, the vibration absorbing layer 30 has the thick engaging portion 32 at the center and, even if an external force is applied to the inertia weight component 20 from the axial direction of the rotary shaft 40, the inertia weight component 20 can powerfully engage with the mounting base 10 by virtue of the engaging force of the engaging portion 32 and can thus be prevented from coming off from the mounting base 10.

The shape of said engaging portion 32 can be changed as desired in accordance with the shape of grooves 111 and 211; for example, the cross-section of the vibration absorbing layer 30 can be elliptical as shown in FIG. 9 or rectangular at its center as shown in FIG. 11.

In this embodiment, side edge portions 31 and 31' of the vibration absorbing layer 30 are provided with external edges 311 and 311' which are formed as a non-tacking skin layer and such formation of the skin layer is disclosed in Japanese Patent Gazette for Laid Open No. SHO 61-51035 and Japanese Patent Gazette for Laid Open No. SHO 62-13839.

The engaging portion 32 of said vibration absorbing layer 30 can be partly formed as shown in FIGS. 12 and 13. In this case, as shown in FIG. 13, at least one engaging portion can be provided in the circumferential directions of the mounting base 10 and the inertia weight component 20. However, it is preferable to provide a plurality of spaced-apart engaging portions.

Figure 14:
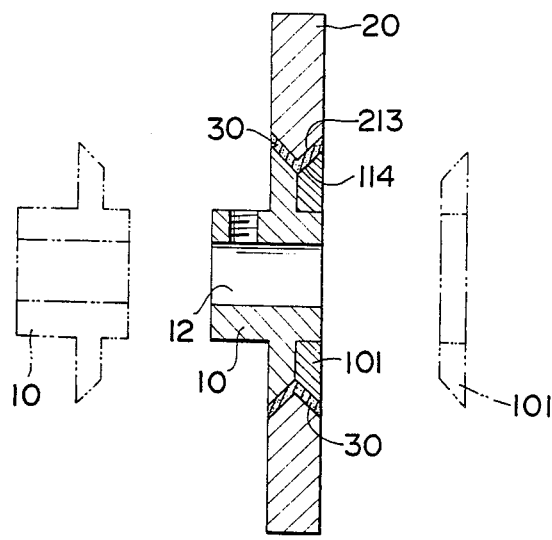
Figure 15:
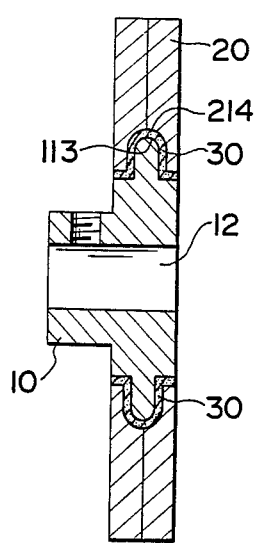
Figure 16:
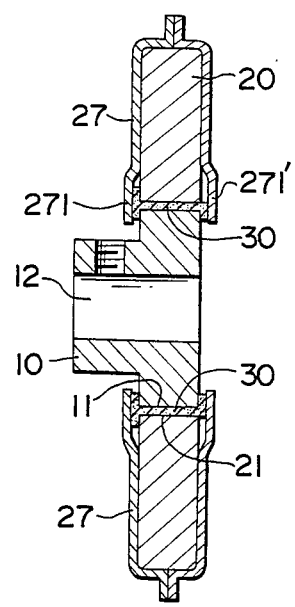

Referring to FIGS. 14 to 16, there are shown other embodiments of the inertia damper in which such inertia weight component 20 as shown in FIGS. 9 to 13 is provided to engage with the mounting base 10.

The inertia dampers shown in FIGS. 14 and 15 are provided with a ridge 113 or 213 which extends in the circumferential direction on the fitting surface of either of the inertia weight component 20 and the mounting base 10 as an engaging means and a groove 114 or 214 which extends in the circumferential direction on the fitting surface of the other member as an engaging means whereby the ridge is fitted into this groove to combine the inertia weight component 20 with the mounting base 10 and the vibration absorbing layer 30 made of gel material is interpositioned between the ridge 113 or 213 and the groove 114 or 214.

In this embodiment, since the ridge is engaged with the groove, the inertia weight component 20 is engaged with the mounting base 10 to be prevented from coming off even though a force from the axial direction of the rotary shaft is applied to the inertia weight component 20.

In the inertia damper shown in this embodiment, the inertia weight component 20 is made as a split type as shown in FIG. 15 or the mounting base 10 is made to be partly dividable at its part 101 as shown with the broken line in FIG. 14 so that the ridge 114 or 214 can be easily formed.

The ridge 113 or 213 as said engaging means can be replaced by a cover piece 27 provided on the inertia weight component 20 as shown in FIG. 16, and this cover piece 27 is made of a rigid material such as, for example, metal or the like and its radially inwardly extending extreme ends are extended outside both axial and bases of the mounting base 10 as free ends 271 and 271'.

In this embodiment, the engaging means in the external wall surface of the mounting base 10 and the inertia weight component 20 is prevented from coming off from the mounting base 10 by engagement of the free ends of the cover piece 27 with the mounting base as the engaging portions 271 and 271' when the inertia weight component 20 is moved by a force in the axial direction of the rotary shaft.

Said cover piece 27 can also be fixed on the mounting base 10. In this case, the free ends of the cover piece 27 as the engaging ends are extended radially outwardly outside the inertia weight component 20 and the external axial wall surface of the inertia weight component 20 is used as the engaging means.

Referring to FIGS. 17 to 21, there is shown the inertia damper for which the vibration absorbing layer 30 is made in advance as a separate member.

According to this embodiment, the vibration absorbing layer 30 is made without using the method of pouring the silicone gel original fluid between the inertia weight component 20 and the mounting base 10 and gelling it through heating.

The vibration absorbing layer 30 is made in advance in the shape of ring by gelling silicone gel material with a mold used in the other process and the non-tacking skin layer 3 is formed on the external surface of this annular vibration absorbing layer 30.

The method by which silicone gel material is thus poured into the mold to be gelled and the non-tacking skin layer 33 is formed on the surface of silicone gel is disclosed in Japanese Patent Gazette for Laid Open No. SHO 61-51035 and Japanese Patent Gazette for Laid Open No. SHO 62-13839.

Figure 17:
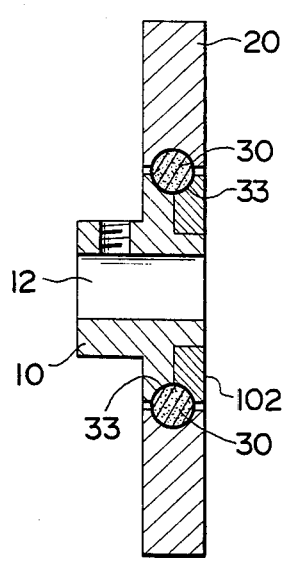
Figure 18:
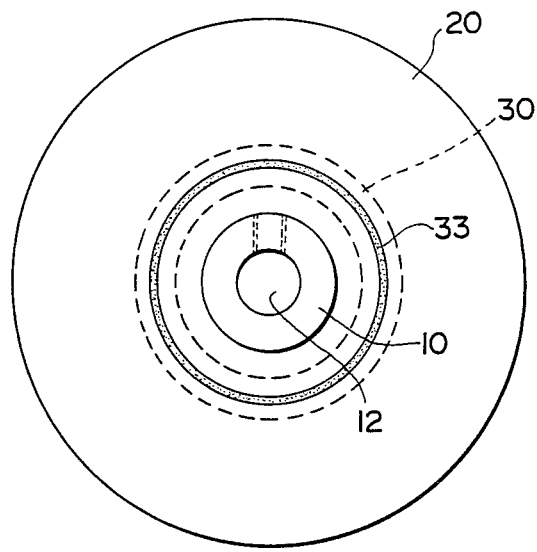
FIG. 18 is a front view of the inertia damper shown in FIG. 17, FIGS. 19 and 20 are, respectively, vertical cross-sectional side views showing another further embodiment of the inertia damper in accordance with the present invention.
Figure 22:
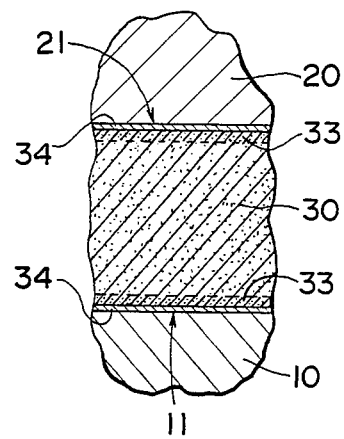
FIG. 22 is a vertical cross-sectional side view showing the magnified principal part of the inertia damper shown in FIG. 19.

Said annular vibration absorbing layer 30, as shown in FIGS. 17 and 18, is accommodated in the space formed between the inertia weight component 20 and the mounting base 10 and adhered and fixed to the fitting surface 21 of the inertia weight component 20 and the fitting surface 11 of the mounting base 10 with an adhesive agent 34 applied to the skin layer 33 as shown in FIG. 22.

Figure 20:
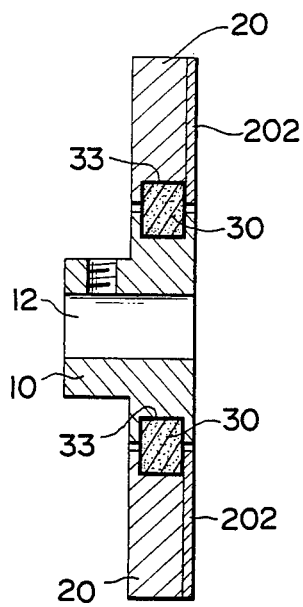

The space formed between the mounting base 10 and the inertia weight component 20 can be made by selecting the shape described in aforementioned embodiments. Since the vibration absorbing layer 30 is handled as a separate component in this embodiment, part 102 or 202 of the inertia weight component 20 or the mounting base 10 is made separable as shown in FIGS. 17 and 20 and the space is designed so that the vibration absorbing layer 30 can be accommodated in the space by removing the part 102 or 202.

Figure 21:
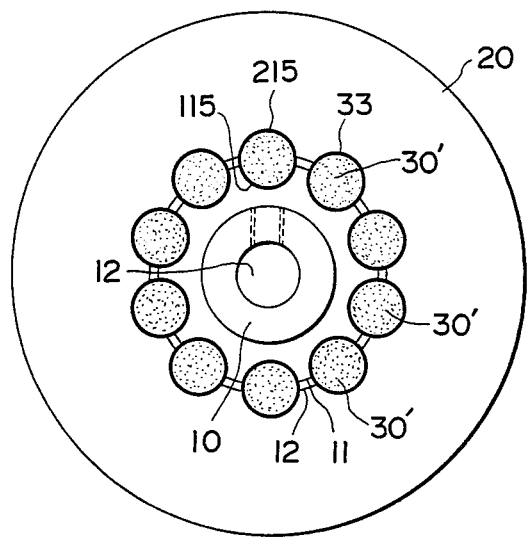
FIG. 21 is a front view showing another further embodiment of the inertia damper in accordance with the present invention.

Said vibration absorbing layer 30 can be made as a plurality of spaced-apart cylindrical portions in radial cross-section as shown in FIG. 21. In this case, the cylindrical vibration absorbing layer 30 can be accommodated in the grooves 115 and 215 which are provided with a specified distance to intersect at right angles to the circumferential direction of the fitting surfaces 11 and 21 of the inertia weight component 20 and the mounting base 10.

Figure 19:
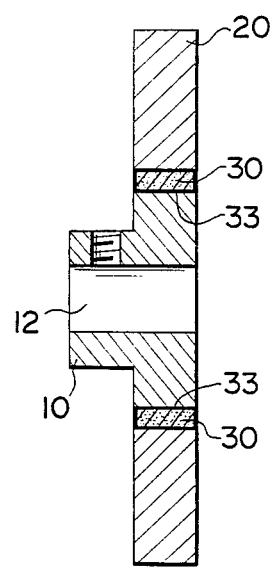

The embodiment shown in FIG. 19 is the inertia damper in which the ring type vibration absorbing layer 30 is adhered to the fitting surface 21 of the inertia weight component 20 and the fitting surface 11 of the mounting base 10 by applying the adhesive agent to both upper and lower portions of the skin layer 33, and both right and left sides (axial ends) of the skin layer 33 of the vibration absorbing layer 30 are exposed to outside.

In this embodiment, the ring type vibration absorbing layer 30 can be prepared as a separate component as described above. As another method, the grooves which oppose each other are provided on the inertia weight component 20 and the mounting base 10 as shown in FIG. 1, a large amount of adhesive agent enough to form the skin layer 33 is applied in advance to the grooves, the inertia weight component 20 is loosely fitted to the outside of the mounting base 10, silicone gel original fluid is poured into the grooves and then heated to be gelled to form the vibration absorbing layer 30, and the skin layer 33 can be formed on the surface of the vibration absorbing layer.

This method is advantageous in that the skin layer 33 can be adhered to the fitting surface 21 of the inertia weight component 20 and the fitting surface 11 of the mounting base 10 at the same time said skin layer 33 is formed.

In the case of the embodiment in which the skin layer 33 is formed on the vibration absorbing layer 30, the vibration absorbing layer 30 can be firmly adhered to the fitting surfaces 21 and 11 with the skin layer 33 of large strength and, even though an external force from the axial direction of the rotary shaft is applied to the inertia weight component 20, the inertia weight component can be prevented from coming off from the mounting base 10.

Referring to FIGS. 23 to 30, there are shown the inertia dampers capable of adjusting the weight of the inertia weight component 20.

According to this embodiment, the inertia weight component 20 can be adjusted to meet the load torque and therefore the braking effect of each inertia damper can be individually improved.

Figure 23:
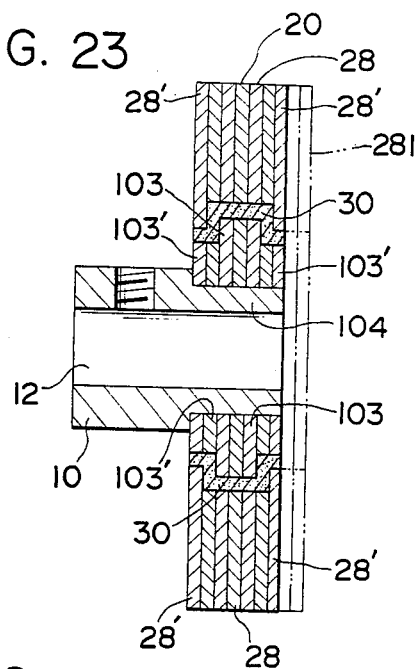
FIG. 23 is a vertical cross-sectional side view showing another further embodiment of the inertia damper in accordance with the present invention.
Figure 24:
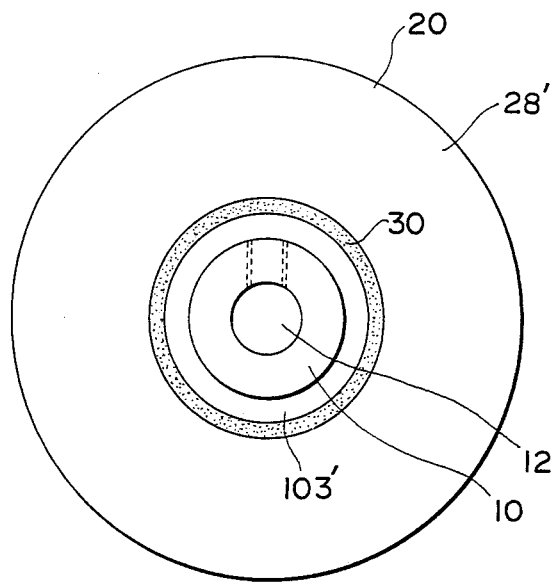
FIG. 24 is a front view of the inertia damper shown in FIG. 23.
Figure 25:
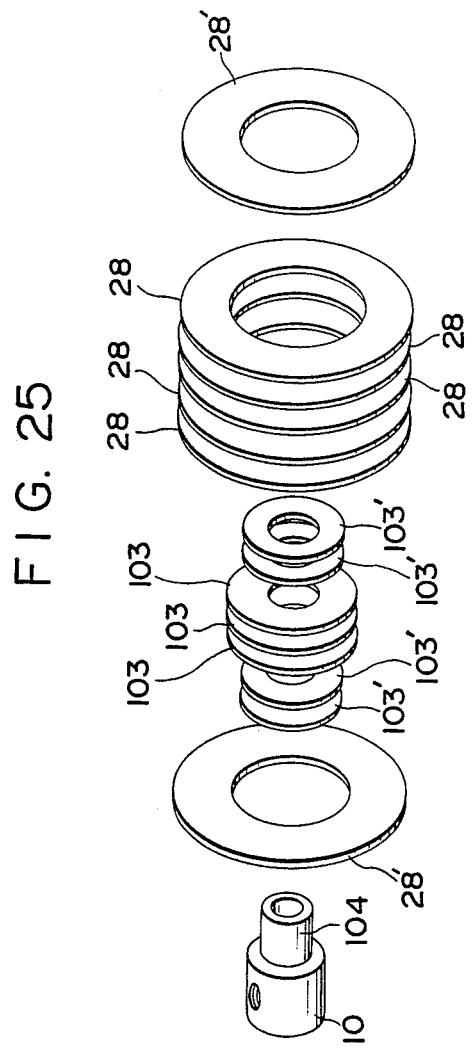
FIG. 25 is a disassembled perspective view of the mounting base and the inertia weight component of the inertia damper shown in FIG. 23, and FIGS. 26 to 30 are, respectively, vertical cross-sectional side views showing another further embodiment of the inertia damper in accordance with the present invention.

In the embodiment shown in FIGS. 23 to 25, the inertia weight component 20 is made up by concentrically stacking a number of doughnut shaped or annular disks 28 and the weight of the inertia weight component 20 is varied by varying the number of disks 28.

In this embodiment, the fitting surface 11 of the mounting base 10 is made up by stacking doughnut shaped or annular disks 103. For this, part of the mounting base 10 includes a fitting part 104 on which the disks 103 are fixed. Said inertia weight component 20 is made up by alternately stacking a plurality of disks 28, which are therefore integrally assembled by welding or an adhesive agent or a fitting means such as screws.

Furthermore in this embodiment, the mounting base 10 is made up by assembling disks 103 with a similar fitting means to said inertia weight component 20 and thus the axial length of the fitting surface 11 of the mounting bases 10 can be coincided with that of the fitting surface 21 of the inertia weight component 20.

In this embodiment, said inertia weight component 20 is made so that the space at the central part in the axial direction can be expanded. To obtain this construction, the center holes of front and rear disks 28' in the axial direction are made to have a small diameter and the center holes of disks 28 at the central part are made to have a large diameter.

This inertia weight component 20 is concentrically fitted to the outside of the mounting base 10, which is made so that the center in the axial direction is expanded.

To obtain this construction, the disks at the mounting base 10 side are made so that each two disks 103' at both sides in the axial direction are made to have a small diameter and the disk 103 at the center is made to have a large diameter.

Accordingly, the vibration absorbing layer 30 in this embodiment is formed to be expanded toward the outside at the center in the axial direction as shown in FIG. 23, and the inertia weight component 20 is prevented from coming off in the axial direction since the outside disk 28' engages with the center disk 103 at the mounting base 10 side in the axial direction since the outside disks 28' extend radially inward of the radially outermost part of disks 103.

In other words, this embodiment provides the same effect for preventing the inertia weight component 20 from coming off as in case of the embodiment shown in FIGS. 14 and 15.

If the shape of the inertia weight component 20 is as shown in FIGS. 3 to 5, said disks 28 and 103 can be made in accordance with the type of inertia weight component 20 and the mounting base 10.

FIGS. 26 to 30, respectively, show another further embodiment of the inertia damper which has the inertia weight component 20 which is thus assembled with the disks 28.

Figure 26:
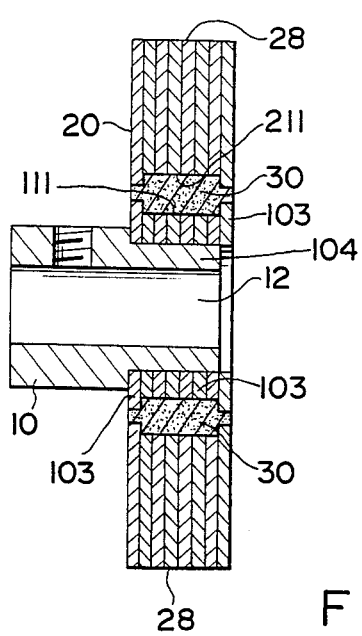

The embodiment shown in FIG. 26 is the inertia damper which provides the coming-off preventing effect for the inertia weight component 20 similar to the embodiment shown in FIGS. 2 and 9 and the vibration absorbing layer 30 is formed to have a large wall thickness in the chamber formed by the groove 211 formed on the fitting surface 21 of the inertia weight component 20 and the groove 111 formed on the fitting surface 11 of the mounting base 10.

Figure 27:
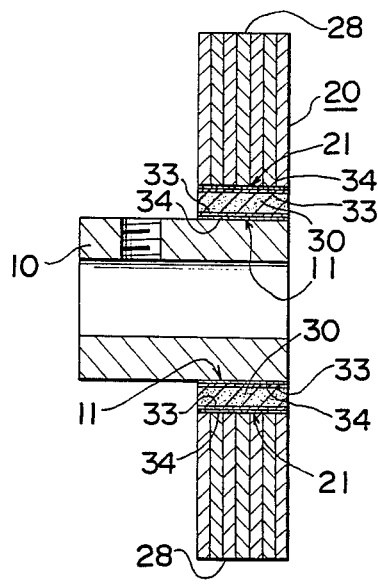

The embodiment shown in FIG. 27 shows the inertia damper in which only the inertia weight component 20 is made up by stacking disks 28.

The vibration absorbing layer 30 of this embodiment is such that the external surface of the vibration absorbing layer 30 is made as the non-tacking skin layer 33, which is adhered and fixed to the fitting surface 21 of the inertia weight component 20 and the fitting surface 11 of the mounting base 10, and both sides of the skin layer 33 in the axial direction are exposed to the outside.

Such vibration absorbing layer 30 as described above is described in detail in FIGS. 17 to 22.

Figure 28:
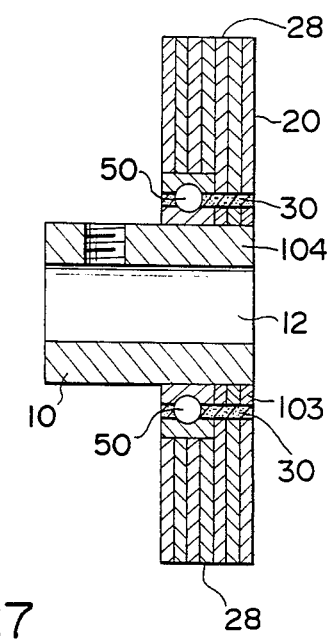

FIG. 28 shows the embodiment in which the ball bearings 50 are provided to maintain the clearance between the inertia weight component 20 and the mounting base 10. According to this embodiment, the weight of the inertia weight component 20 which is applied to the vibration absorbing layer 30 can be averaged as in the case of the embodiment shown in FIGS. 1 and 5.

In this embodiment, the inside of the housing of the bearing 50 is filled with gel material but the bearing 50 is mainly used to maintain the clearance. Accordingly, the housing of the bearing 50 need not be filled with gel material.

The embodiments shown in FIGS. 29 and 30 are the inertia dampers in which the doughnut shaped or annular disk inertia weight component 20 is respectively accommodated in a space formed by the radially extending disk type fitting surfaces 11' and 11' of the mounting base 10 and the vibration absorbing layer 30 is provided between the disk type fitting surfaces 11' and 11' and the radially extending fitting surfaces 21' and 21' of the disk type inertia weight component 20. This inertia damper provides the same effect as the inertia damper of the type shown in FIG. 7.

In the embodiment shown in FIG. 30, vibration absorbing layers 281' and 281' are provided respectively between adjacent spaced-apart disks 28 which form the inertia weight component 20, and the vibration is absorbed in the inertia weight component 20 as in the embodiment shown in FIG. 6.

Hereupon, the weight of said inertia weight component 20 can be adjusted by attaching one or more spare doughnut shaped or annular disks 281 to the inertia weight component 20 as shown with the broken line in FIG. 23.

Such construction as described above is advantageous in that the weight of the inertia damper as a finished product can be adjusted to meet the load torque of the applicable object in actual use.

In addition, the skin layer 33 formed on said vibration absorbing layer 30 can be obtained by applying an acetic acid type or oxime type coating agent using silicone resin as the base or a polymer containing SiH or a mixture of catalyst and the polymer containing SiH to the surface of silicone gel. As this coating agent, SH237 Dispersion (product name) which is the mold parting agent made by Toray Silicone Kabushiki Kaisha, SE5001, SH780, SE5002 and SE504 (product name) which are the adhesive agents made by Toray Silicone Kabushiki Kaisha and SCA 101 (product name) which is the bridging booster made by Toray Silicone Kabushiki Kaisha are available.

The present invention is not limited to the above-mentioned embodiments and diversified modifications and variations are available within the range of claim which does not exceed the spirit of the present invention.

What is claimed is:

1. An inertia damper comprising a mounting base to be mounted on a rotary shaft, a vibration absorbing layer one surface of which is coupled to said mounting base and an inertia weight component which is coupled to the other surface of said vibration absorbing layer and to said mounting base through said vibration absorbing layer, wherein said vibration absorbing layer is made of a gel material with a penetration value of approximately 50 to 200.

2. An inertia damper in accordance with claim 1, said vibration absorbing layer is made of a silicone gel material.

3. An inertia damper in accordance with claim 1, wherein said mounting base is adapted to have a shaft hole through which the rotary shaft is inserted and a circumferential external peripheral surface around said shaft hole as a fitting surface, said inertia weight component is made as a doughnut type disk in the center of which a hole into which said mounting base is loosely fitted is provided with the internal surface of the hole serving as the fitting surface, and said vibration absorbing layer is formed between the fitting surface of said mounting base and the fitting surface of said inertia weight component.

4. An inertia damper in accordance with claim 3, wherein grooves which are opposed each other are provided at the center of the fitting surface of said mounting base and the center of the fitting surface of said inertia weight component in the circumferential direction of the fitting surfaces and said vibration absorbing layer is formed to fill the groove.

5. An inertia damper in accordance with claim 3, wherein at least parts of the fitting surface of said mounting base and the fitting surface of said inertia weight component are protruded in the radial direction and these protruded parts are gear-meshed each other.

6. An inertia damper in accordance with claim 3, wherein at least one groove is provided respectively on the fitting surface of said mounting base and the fitting surface of said inertia weight component and the vibration absorbing layer is provided in said groove.

7. An inertia damper in accordance with claim 3, wherein said inertia weight component comprises a plurality of doughnut type annular members which are concentrically assembled and at least one vibration absorbing layer which is provided between said annular members to couple these annular members and said vibration absorbing layer is made of gel material with the penetration value of approximately 50 to 200.

8. An inertia damper in accordance with claim 3, wherein both circumferential sides of the vibration absorbing layer between said mounting base and said inertia weight component are exposed to outside and a non-tacking skin layer is formed on these exposed parts.

9. An inertia damper in accordance with claim 3, wherein an engaging means for engaging the inertia weight component with the mounting base is provided on one of said mounting base and said inertia weight component to prevent the inertia weight component from movement when said inertia weight component is moved in the axial direction of the rotary shaft.

10. An inertia damper in accordance with claim 9, wherein a ridge which extends in the circumferential direction of the fitting surface is provided on one of the fitting surfaces of said mounting base and said inertia weight component and a groove into which said ridge is inserted is provided on the other of said fitting surfaces to engage said ridge with the groove.

11. An inertia damper in accordance with claim 9, wherein a cover is provided on one of said inertia weight component and said mounting base, both free ends of said cover are extended outside the other of said inertia weight component and said mounting base to be engaged with one of the inertia weight component and the mounting base which is opposed to the free end of the cover serving as the engaging part.

12. An inertia damper in accordance with claim 1, wherein an external surface of said vibration absorbing layer is formed as a non-tacking skin layer which is adhered to the fitting surface of said mounting base and the fitting surface of said inertia weight component.

13. An inertia damper in accordance with claim 12, wherein both sides of the skin layers of said vibration absorbing layer are exposed outside between said mounting base and said inertia weight component.

14. An inertia damper in accordance with claim 3, wherein said inertia weight component is made up by concentrically assembling a plurality of doughnut type disks.

15. An inertia damper in accordance with claim 3, wherein ball bearings are provided between said inertia weight component and said mounting base to maintain a clearance between said inertia weight component and said mounting base.

16. An inertia damper in accordance with claim 1, wherein said mounting base is adapted to have the shaft hole into which the rotary shaft is inserted and the fitting surface which expands in the shape of disk around said shaft hole as the center in a direction orthogonal to the axis of the rotary shaft, said inertia weight component has the disk type fitting surface opposed to said disk type fitting surface and said vibration absorbing layer is formed between the fitting surface of said mounting base and the fitting surface of said inertia weight component.

17. An inertia damper in accordance with claim 16, wherein said mounting base is provided at an extreme end of the rotary shaft and a circumferential edge is provided at the outer periphery of the fitting surface whereby the disk type inertia weight component is accommodated in said circumferential edge.

18. An inertia damper in accordance with claim 16, wherein said mounting base has a space formed by a pair of opposing disk type fitting surfaces and the disk type inertia weight component accommodated in said space is coupled to the vibration absorbing layer with its both surfaces in the axial direction as the fitting surfaces.

19. An inertia damper in accordance with claim 18, wherein said disk type inertia weight component is made up by concentrically stacking a plurality of doughnut type disks as an assembly.

20. An inertia damper in accordance with claim 19, wherein a vibration absorbing layer is provided to couple each disk adjacent to the doughnut type disks which comprise said inertia weight component and said vibration absorbing layer provided between each adjacent disks is made of a gel material with the penetration value of approximately 50 to 200.

* * * * *